United States Patent [19]
Clarke et al.

[11] 3,988,679
[45] Oct. 26, 1976

[54] WIDEBAND RECEIVING SYSTEM INCLUDING MULTI-CHANNEL FILTER FOR ELIMINATING NARROWBAND INTERFERENCE

[75] Inventors: James McMillen Clarke, Whitesboro; Charles E. Hearty, Marcy; John A. Rougas, Liverpool, all of N.Y.

[73] Assignee: General Electric Company, Utica, N.Y.

[22] Filed: Feb. 24, 1975

[21] Appl. No.: 552,499

Related U.S. Application Data
[63] Continuation-in-part of Ser. No. 357,160, May 4, 1973, abandoned.

[52] U.S. Cl................................. 325/377; 325/473
[51] Int. Cl.²........................................... H04B 1/10
[58] Field of Search .............. 325/3, 373, 374, 376, 325/377, 379, 388, 437, 473–478; 328/167; 330/124 R, 126; 343/17.2 R, 17.2 PC; 179/1 P

[56] References Cited
UNITED STATES PATENTS

| | | | |
|---|---|---|---|
| 3,112,452 | 11/1963 | Kirkpatrick | 328/167 |
| 3,213,372 | 10/1965 | Kurvits | 325/478 |
| 3,283,249 | 11/1966 | Mitchell | 325/3 |
| 3,292,116 | 12/1966 | Walker et al. | 179/1 P |
| 3,411,088 | 11/1968 | Hutchison | 325/3 |
| 3,495,244 | 2/1970 | La Rosa | 325/473 |
| 3,605,012 | 9/1971 | Kubanoff | 325/473 |
| 3,667,043 | 5/1972 | Ahlgren | 325/3 |

*Primary Examiner*—Benedict V. Safourek
*Assistant Examiner*—Jin F. Ng

[57] ABSTRACT

In a returned wave object detection receiving system, for receiving a wideband signal, means are provided for attenuating narrowband interference. A returned signal is split such that equal power broadband signals are applied to a plurality of channels. In each channel, the broadband signal is coupled through a narrowband filter and a linear amplifier in parallel with a detector and noise correlator. The narrowband signals are recombined in an adder having an output coupled to utilization means. Disabling means are coupled in each channel for disabling one narrowband channel in response to narrowband interference therein.

2 Claims, 8 Drawing Figures

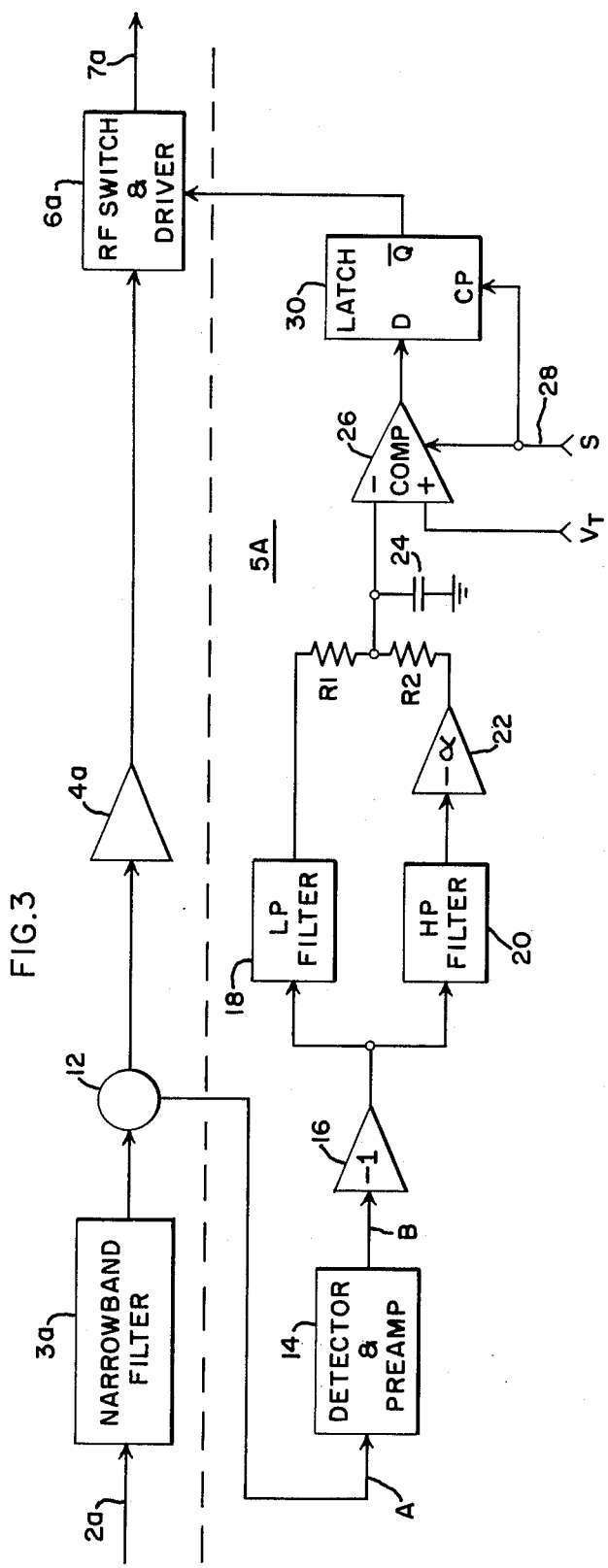
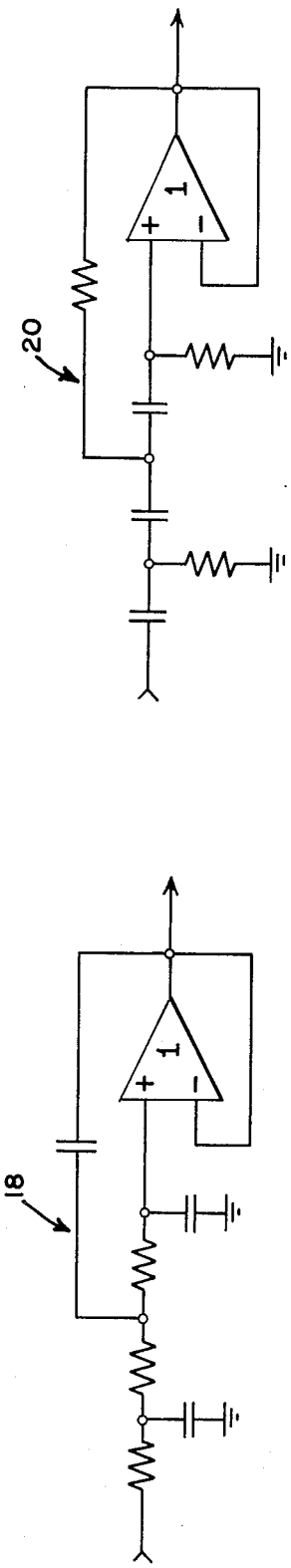
FIG.3
FIG.4a
FIG.4b

WIDEBAND RECEIVING SYSTEM INCLUDING MULTI-CHANNEL FILTER FOR ELIMINATING NARROWBAND INTERFERENCE

CROSS-REFERENCE TO RELATED APPLICATION

This is a continuation-in-part of application Ser. No. 357,160 filed May 4, 1973 by James M. Clarke, Charles E. Hearty and John A. Rougas entitled "Wideband Receiving System Including Multi-Channel Filter for Eliminating Narrowband Interference", now abandoned.

BACKGROUND OF THE INVENTION

This invention relates to reflected wave object detection systems, and more particularly to elimination of narrowband interference appearing in wideband returns.

In a wideband object detection system, narrowband interference may enter a system's detector and inhibit detection of desired wideband signals. An example of a wideband object detection system is pulse compression radar. In a pulse compression radar system a conventional narrow pulse, wideband radar signal is generated and expanded by some means such as a delay line circuit prior to transmission. A wideband signal is thus transmitted. The wideband return is received and coupled through a complementary circuit which compresses the return signal for processing by the radar system. In this manner, a radar system may utilize the power capability of a long pulse system while maintaining the resolution available with a narrow pulse system. An example of pulse compression radar is found in U.S. Pat. No. 3,216,013 — Thor issued Nov. 2, 1965 and assigned to General Electric Company, the assignee herein. In such a system, reception of a narrowband signal at the same frequency as the compressed pulse which is processed by the system may inhibit detection of the wideband signal which is compressed.

Prior systems have been provided which provide noise limiting of an entire wideband signal. While such systems are effective, they decrease dynamic range. For example, if a non-linear device is used which limits 10db on wideband noise in a system having an 18db compression ratio, the maximum a target will compress will be 8db above noise. For systems incorporating video blanking in high clutter (ground return) environments, it is advantageous to maintain full dynamic range in order to avoid blanking target returns in clutter.

OBJECTS AND SUMMARY OF THE INVENTION

It is therefore an object of the present invention to provide means for minimizing narrowband interference in a wideband returned wave object detection system while maintaining normal detector dynamic range and system sensitivity.

It is a further object of the present invention to provide a signal processing arrangement of the type described in which linearity is maintained.

It is a more specific object of the present invention to provide a signal processing arrangement of the type described utilizing a plurality of narrowband channels to process a wideband signal.

Briefly stated, in accordance with the present invention, in a returned wave object detection receiving system for receiving a wideband signal, means are provided for detecting and attenuating narrowband interference. A returned signal is split into a plurality of wideband signals, each of which is coupled to a separate channel. In each channel, the wideband signal is coupled through a narrowband filter and a linear amplifier in parallel with a detector and noise correlator. The narrowband signals are recombined in an adder having an output coupled to utilization means. Disabling means are coupled in each channel for disabling one narrowband channel in response to narrowband interference therein.

BRIEF DESCRIPTION OF THE DRAWINGS

The means by which the foregoing objects and features of novelty are achieved are pointed out with particularity in the claims forming the concluding portion of the specification. The invention, both as to its organization and manner of operation, may be further understood by reference to the following description taken in connection with the following drawings.

Of the drawings:

FIG. 3 is a schematic diagram showing the "$a$" signal channel of FIG. 1 and in particular illustrating the details of the detector and noise correlator portion thereof.

FIGS. 4a and 4b are schematic circuit diagrams of the low pass filter and the high pass filter, respectively, shown in FIG. 3.

DESCRIPTION OF THE PREFERRED EMBODIMENT

Figure 1:
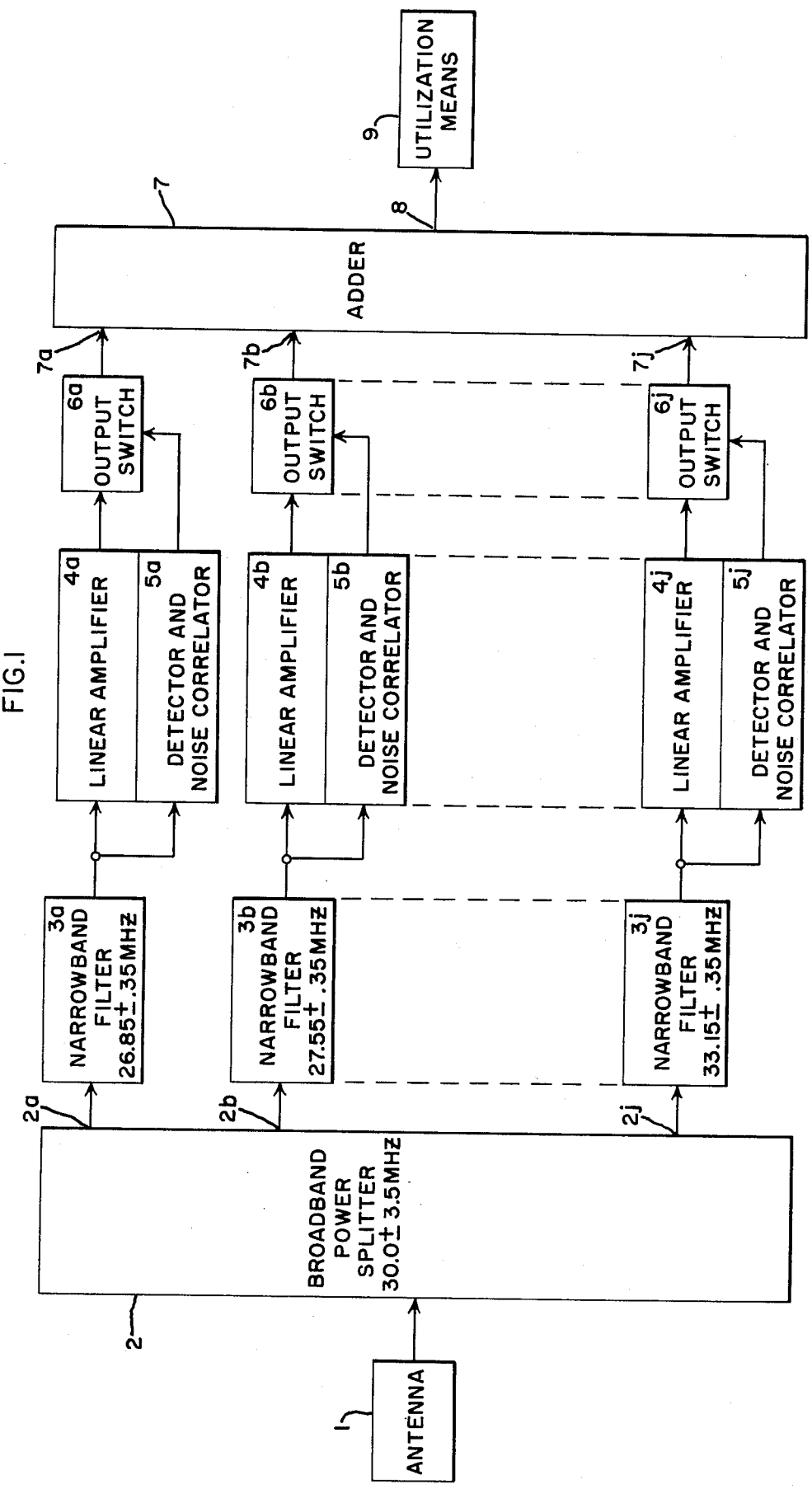
FIG. 1 is a block diagrammatic illustration of a signal processing circuit constructed in accordance with the present invention for incorporation in a system such as a pulse compression radar system.

Referring now to FIG. 1, there is illustrated in block diagrammatic form a circuit for minimizing narrowband interference constructed in accordance with the present invention.

Returned signals are supplied to the circuit by an input means such as an antenna 1. In other embodiments, it is possible for the signal which is processed by the circuit of the present invention to be provided from other signal processing circuitry rather than directly from an antenna. The antenna 1 has an output coupled to a broadband power splitter 2 which provides a plurality of wideband outputs, each comprising the information of the input signal. The outputs of the broadband power splitter 2 are designated 2a, 2b, . . . 2j. While ten is the total number of outputs selected for a particular embodiment, the number of outputs chosen for the broadband power splitter 2 is a matter of choice. The number of outputs desired depends upon the degree of resolution of narrowband signals desired which must be considered in conjunction with the cost and limitations of providing a larger number of signal processing channels. Channels $a, b \ldots j$ are provided, each respectively connected to the correspondingly alphabetically designated output of the broadband power splitter 2. Components of each channel $a-j$ are denoted by a number indicating a component and a letter denoting the channel in which the component is included. Discussion of the construction of each channel is general and therefore each component in each channel below is designated by number only, there being one of each component in each channel $a$ through $j$. The following description is in terms of components of an analog system. Equivalent components for construction of a digital system will suggest themselves readily to those skilled in the art.

Each channel $a-j$ comprises a narrowband filter 3 having an input connected to one output of the broadband power splitter 2 and providing an output to a linear amplifier 4 and also to a detector and noise correlator 5. The output of the linear amplifier 4 is connected to a signal input of an output switch 6, and the output of the detector and noise correlator 5 is connected to a control input of the output switch 6. Each output switch $6a$, $6b$, ... $6j$ is respectively connected to an input $7a$, $7b$, ... $7j$ of an adder 7. The adder 7 has an output 8 connected to utilization means 9.

The utilization means 9 include radar receiving circuitry and they also include signal compressing circuitry. The utilization means 9 may also be viewed as an entire radar circuit including a transmitter.

FIG. 3 shows in detail the circuits of signal channel $a$. The broadband signal from output $2a$ of power splitter 2 is passed to input $7a$ of adder 7 through the narrowband filter $3a$, a signal divider 12, the linear amplifier $4a$ and the rf switch $6a$. The latter may be a conventional diode microwave switch and includes appropriate drive circuits for interrupting the path to input $7a$ in response to a logic level signal from the detector and noise correlator circuits $5a$. In the absence of the logic level signal switch $6a$ is closed and passes the signal to input $7a$ substantially undiminished.

The detector and noise correlator circuits $5a$ are shown below the dashed line in FIG. 3. Since the corresponding circuits $5b$–$5j$ for the other signal channels are substantially identical to the circuit $5a$ only the latter is described herein.

The broadband signal from the second output of signal divider 12 is presented to the input of a detector and preamplifier 14. The signal passed by the signal divider is an i.f. signal of a form, for example, shown on the voltage-time plot of FIG. $5a$. Detector 14 is a conventional envelope detector which demodulates the i.f. signal, i.e., it removes the rf carrier and presents the detected envelope on output line B. The resultant signal is of the form illustrated on the plot of FIG. $5b$. This signal is transmitted to a pair of parallel-connected high and low pass filters 20 and 18 by a unity-gain inverting amplifier 16. Amplifier 16 serves as a zero source resistance driver for the filters and may be any conventional wideband operational amplifier.

The filters 18 and 20 operate to detect the presence of a strong low-frequency (essentially D.C.) signal component in the envelope signal passed by detector 14. Such a signal component represents the type of narrowband interference which is desired to be suppressed. Suppression of this signal is effected by the opening of switch $6a$ which results in the exclusion of the $a$ channel signal from the summation signal generated on output 8 of adder 7 as described above.

Control of switch $6a$ is implemented through the use of a summing network comprising a variable gain, inverting amplifier 22 and a pair of summing resistances R1 and R2. Amplifier 22 may be an operational amplifier of the type utilized for amplifier 16 except that a variable resistance is provided in the feedback for gain adjustment. Amplifier 22 also includes means for rectifying the signal from filter 20.

The outputs from filters 18 and 20 (the output of the latter having been rectified and inverted by amplifier 22) are summed at the junction of R1 and R2 and a difference signal is presented to the negative input port of a voltage comparator amplifier 26. If the magnitude of the signal at the negative port exceeds the D.C. level presented to the positive port from a threshold voltage source $V_T$ the output of amplifier 26 switches and presents a logic level signal to latch circuit 30 which in turn operates the driver logic of switch $6a$ to open (interrupt) the channel. Latch 30 may be a conventional "D latch" logic circuit. When the signal at the R1-R2 junction point drops below the $V_T$ threshold amplifier 26 switches back to its normal state and causes switch $6a$ to recouple the i.f. signal to adder input $7a$.

An integrating capacitor 24 may be coupled to the R1-R2 junction point to provide a smoothing effect. This is helpful in situations when the magnitude of the R1-R2 difference signal is riding close to that of $V_T$. The smoothing action of capacitor 24 tends to minimize "toggling" of the latch 30, i.e., it prevents high frequency fluctuations of the R1-R2 signal from switching comparator 26 back and forth. Also, a sampling signal S may be fed to the comparator and the latch on a line 28. This signal may be used to gate the operation of the detector and noise correlator so that it can operate to turn off channel switch $6a$ only at certain times during system operation, e.g., when the broadband signal on input line $2a$ is most likely to contain narrowband interference as distinguished from, for example, clutter return signals.

FIGS. $4a$ and $4b$ show the low pass and the high pass filter circuits, respectively. The filters may, for example, be third order transitional Butterworth-Thompson circuits.

OPERATION OF THE CIRCUIT

Assume an embodiment for detecting a broadband returned signal having a bandwidth of 7 MHz centered at 30.0 MHz. Ten channels $a-j$ are provided in the present embodiment, and the broadband power splitter 2 is selected to provide ten broadband outputs each having a bandwidth of 7 MHz. This frequency range is noted on the abscissa of the plot of FIG. 2, in which the ordinate is signal amplitude. The bandwidths of the narrowband filters $3a-3j$ are selected to provide ten contiguous narrowband output signals having bandwidths of 700 KHz. The inputs of the narrowband filters $3a-3j$ are connected to the outputs of the broadband power splitter $2a-2j$ (FIG. 1). Operation in the presence of ambient wideband noise is first explained prior to operation to minimize narrowband interference. Assume the returned wave signal being processed is a linear frequency modulated pulse with a bandwidth of 7 MHz centered at 30.0 MHz having a signal level of PS and that the ambient wideband noise received is of the same frequency range having a power level PN. The linear frequency modulated returned wave signal has an instantaneous bandwidth that approaches $0_{HZ}$. It may therefore be assumed that the signal can only occupy one channel $a-j$ at a time. Consequently, the channel $a-j$ which is occupied by the signal at any time $t$ during the pulse contributes exactly the input signal power to the linear amplifier 4 and the output switch 6 for coupling to the adder 7.

The noise power in each channel $a - j$ after passing through each narrowband filter 3 is $PN/j$. In the adder, the ambient wideband noise contributed by each channel $a - j$ is combined such that the output power contributed by the channel occupied by the signal at a time $t$ may be expressed as $PN/j + PS$. The power contributed to the adder 7 by the remaining channels may be expressed as $(j-1) PN/j$. Thus the total output power equals total input power, mainly $PN + PS$. In other words, the circuit of the present invention is linear, and the above-described input/output characteristics remain valid for any value of signal and noise in any channel.

Figure 2:
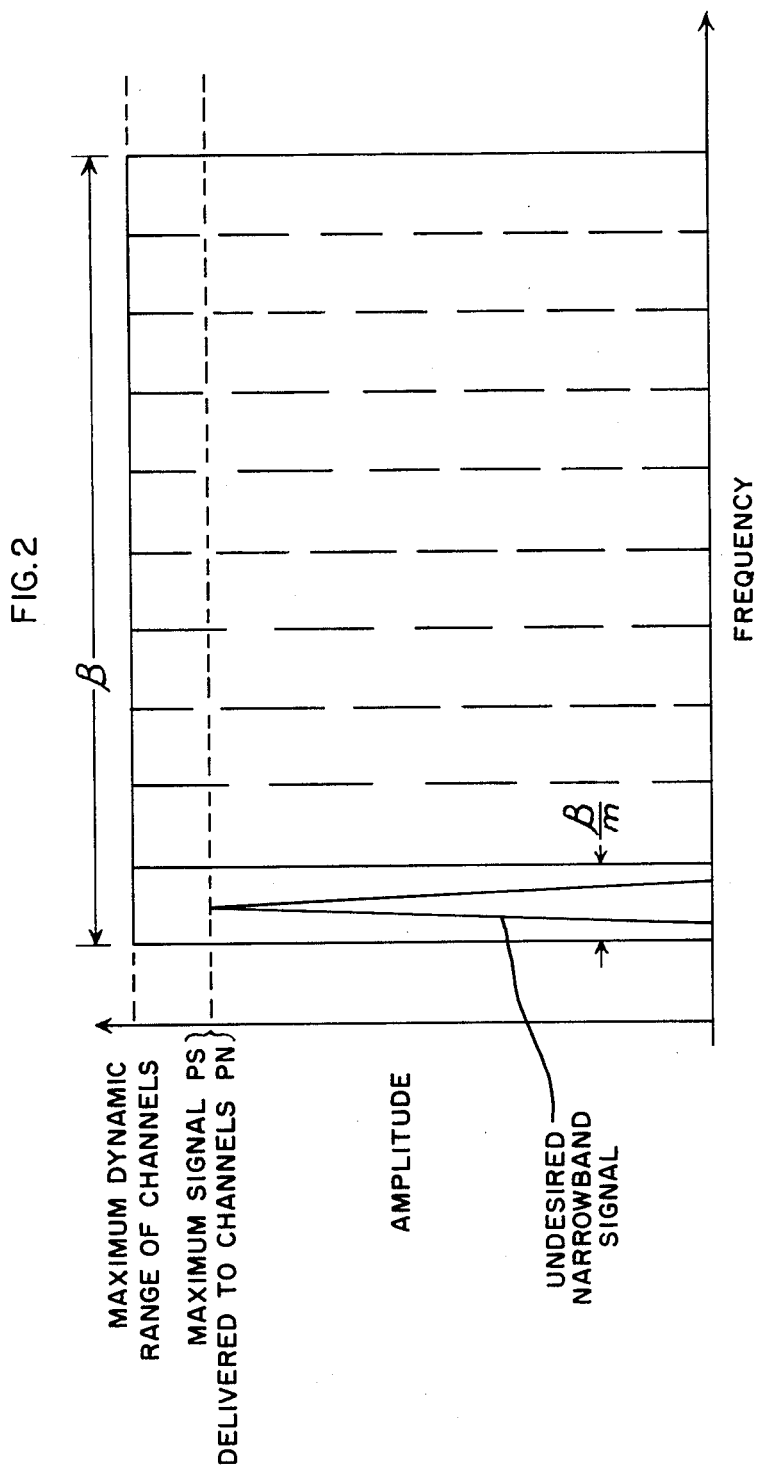
FIG. 2 is a waveform chart illustrating a wideband returned signal and an undesired narrowband signal interference.
Figure 5A:
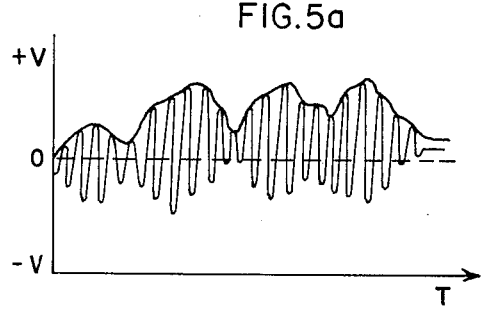
FIGS. 5a and 5b are waveform diagrams depicting the i.f. signal at point A and the demodulated signal at point B indicated at the input and output, respectively, of the detector and preamplifier of FIG. 3.
Figure 5B:
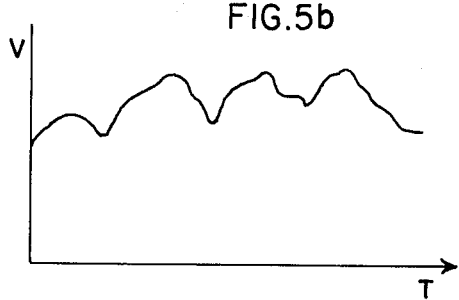
Figure 5C:
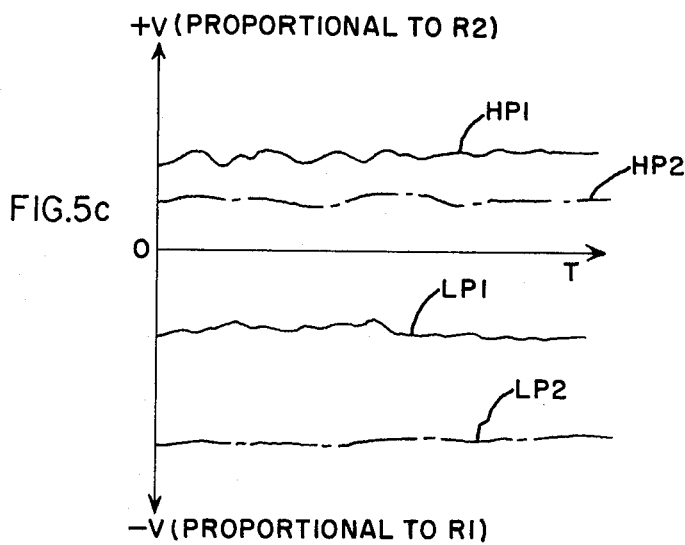
FIG. 5c is a waveform diagram showing the high and low pass filter outputs summed by the resistors R1 and R2 of FIG. 3.

The system reacts to undesirable narrowband signals as follows. Assume and undesirable level of narrowband interference is present at a frequency of 26.85 MHz. This signal is illustrated in FIG. 2 as a narrowband signal peak having a level equal to the maximum signal level delivered to each channel $a - j$. This signal passes through filter 3a (FIG. 3) with no attenuation, and is coupled to the linear amplifier 4a and the detector and noise correlator 5a. The power level of the desired broadband signal components are reduced by a factor of ten by the filter 3a. This is because the pass band of the filter is one-tenth of the band of the total signal. The low frequency components of the channel signal are thus magnified substantially in comparison to the high frequency components. The high and low pass filters 20 and 18, operating through the summing network R1–R2 on the comparator 26 generate a detection output signal by virtue of the fact that low pass filter 18, in passing only the low frequency portion of the channel signal, presents the summing network with a substantially greater signal level than is received from the high pass filter. This is seen in the voltage-time plot of FIG. 5c. The output from filter 20 is the relatively low level positive signal HP2 while the output from filter 18 is the higher level negative signal LP2. The difference signal HP2-LP2 exceeds the threshold level $V_T$ such that latch 30 operates to turn switch 6a off.

The variable gain amplifier 22 is set so that in the presence of a pure broadband signal the high pass output HP1 is approximately equal to the low pass output LP1. The threshold level $V_T$ is selected so that switch 6a is turned off only under the condition when the HP-LP ratio is substantially weighted in favor of the LP output.

In the situation where switch 6a shuts off the $a$ channel the total input to the adder 7 from channels $b-j$ is $(j-1) PS + (j-1) PN$, where $j$ is the number of channels. In accordance with the previous description, the total output from the adder 7 at the output 8 is equal to $(j-1) (PS + PN)$. In other words, the high level undesired narrowband interference is eliminated while only a small portion of desired target signal power is lost. As the number of channels is increased, the effect of narrowband interference is reduced.

What is thus provided is a signal processing arrangement in which linearity is maintained while undesired narrowband signals are rejected. The description of the present embodiment should suggest other ways in which a signal processing arrangement in accordance with the present invention can be achieved, such as by the use of digital signal processing components.

We claim:

1. Means for removing narrowband interference from a wideband signal for connection between an input means and a utilization means comprising, in combination:
    a broadband power splitter coupled to said input means;
    an adder for providing an output to said utilization means; and
    a plurality of channels coupled between said broadband power splitter and said adder, each channel comprising a narrowband filter having a bandwidth corresponding to a portion of the bandwidth of said broadband power splitter, a linear amplifier for amplifying the signal passed by said narrowband filter, an envelope detector connected to the output of said narrowband filter, high and low pass filters connected in parallel with each other and in series with said envelope detector, and switch means connected to transmit the output of said linear amplifier to said adder, said switch means including control means responsive to the outputs of said high and low pass filters for operating said switch means to substantially attenuate the transmission of said signal from said linear amplifier to said adder when the difference in signal levels passed by said high and low pass filters indicates the presence of a narrowband signal, whereby the output of one channel is attenuated in the presence of a narrowband signal and a linear system is provided.

2. A receiving system for eliminating narrowband interference from a wideband signal coupled between an input means and utilization means comprising, in combination:
    a plurality of bandpass filters coupled to said input means, each of said filters having a passband comprising a different portion of the bandwidth of said wideband signal;
    an amplifier connected to the output of each of said bandpass filters;
    interference detection means coupled to the outputs of said bandpass filters, said interference detection means being responsive to a narrowband signal passed by one of said filters and providing a predetermined output indicative thereof;
    coupling means for coupling the signals passed by said amplifiers to the utilization means to present a wideband signal thereto; and
    switch means connected between the outputs of said amplifiers and said coupling means, said switch means being controlled by said interference detection means such that said predetermined output from the latter operates to cause said switch means to substantially attenuate the signal passed by the amplifier connected to the bandpass filter passing a narrowband signal, whereby narrowband distortion is substantially eliminated from said wideband signal as presented to said utilization means.

* * * * *